United States Patent Office 3,320,616
Patented May 16, 1967

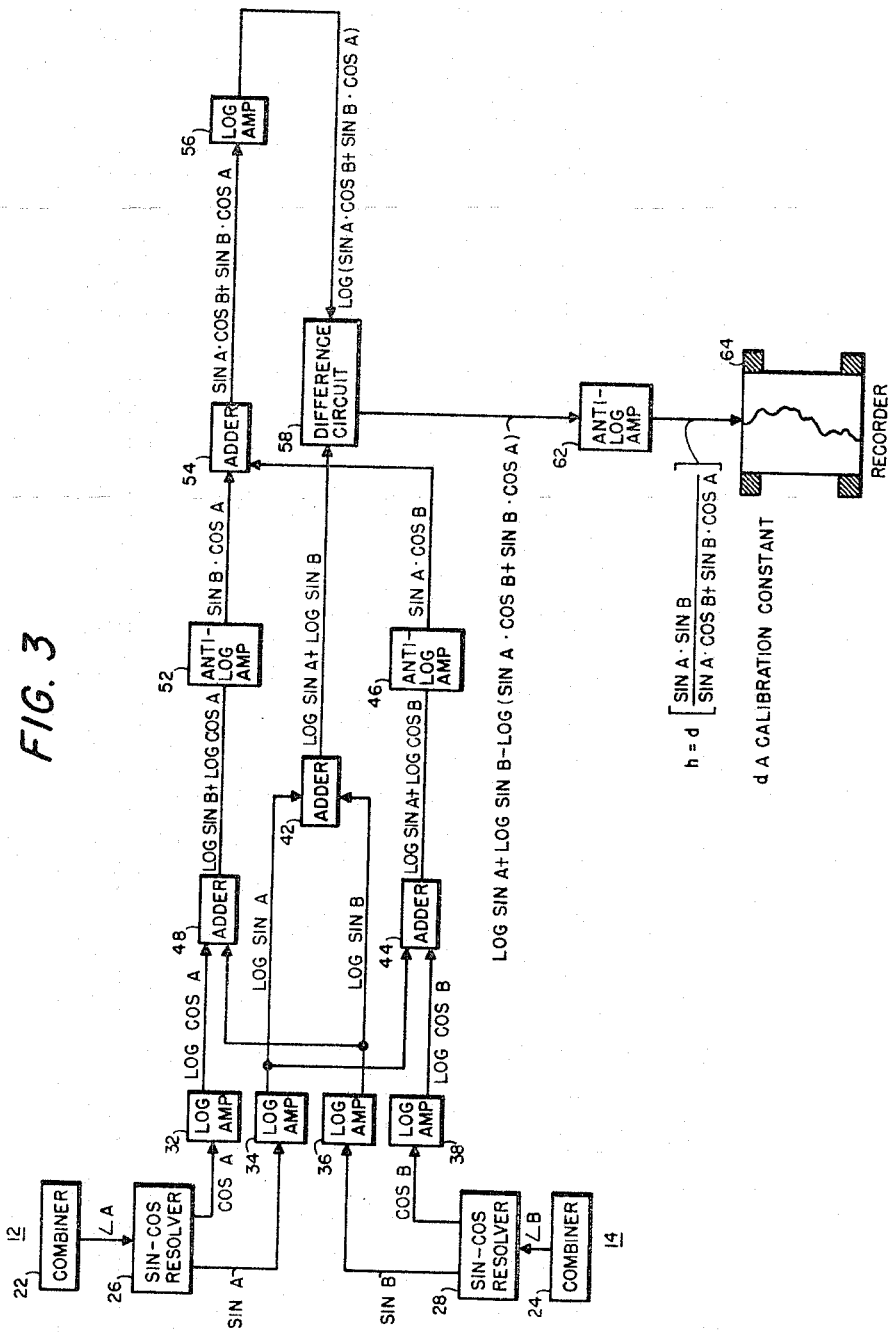

3,320,616
SATELLITE ALTITUDE DETERMINATION BY RADIO INTERFEROMETRY
Maxime G. Kaufman, Camp Springs, Md., and Francis X. Downey, Annandale, Va., assignors to the United States of America as represented by the Secretary of the Navy
Filed Apr. 16, 1965, Ser. No. 448,896
1 Claim. (Cl. 343—112)

The invention described herein may be manufactured and used by or for the Government of the United States of America for governmental purposes without the payment of any royalties thereon or therefor.

The present invention relates generally to improvements in radio interferometer type space surveillance systems and more particularly to a circuit which computes the height of a satellite.

Recent technological advances have resulted in an ever increasing number of man-made satellites being placed in orbit around the earth. For obvious reasons it became desirable to provide systems which would detect and monitor the orbiting satellites which pass over the continental United States. One of these systems is the Naval Space Surveillance System which is described in U.S. Patent No. 3,122,741 issued to Roger L. Easton on February 25, 1964 and the related U.S. Patent No. 3,125,756 issued to Maxime G. Kaufman and Leonard O. Hayden on Mar. 17, 1964. As described more fully in the mentioned patent, in the Naval Space Surveillance System a "fence" or thin wall of C.W. energy is erected across the southern half of the United States. An orbiting satellite upon crossing through this "fence" reflects a portion of this C.W. energy which is received at widely separated radio interferometer receiving sites. The radio interferometer receivers at these sites provide an angular indication of the satellite location with respect to the particular receiver site. Prior to this invention the height of the orbiting satellites, which is of value in plotting future orbits, was determined from the angular indications by graphical means. The present invention eliminates the need for such graphical computations by electronically and automatically computing the satellite height from two electrical signals which are representative of the angular position of the satellite with respect to two receiver sites.

It is, therefore, an object of this invention to provide for the automatic computation of the height of an orbiting satellite.

Another object is to provide an electrical circuit which combines two signals from different locations which are indicative of the direction of a satellite into an indication of the height of the satellite.

Yet another object of the present invention is the provision of an electrical circuit which is suitable for use with a space surveillance system of the radio interferometer type for computing the height of an orbiting satellite.

With these and other objects in view, as will hereinafter more fully appear, and which will be more particularly pointed out in the appended claim, reference is now made to the following description taken in connection with the accompanying drawings in which:

FIG. 2 is a schematic view of one of the radio interferometer receiver sites of a space surveillance system and FIG. 3 is a schematic diagram of the present invention.

Figure 1:
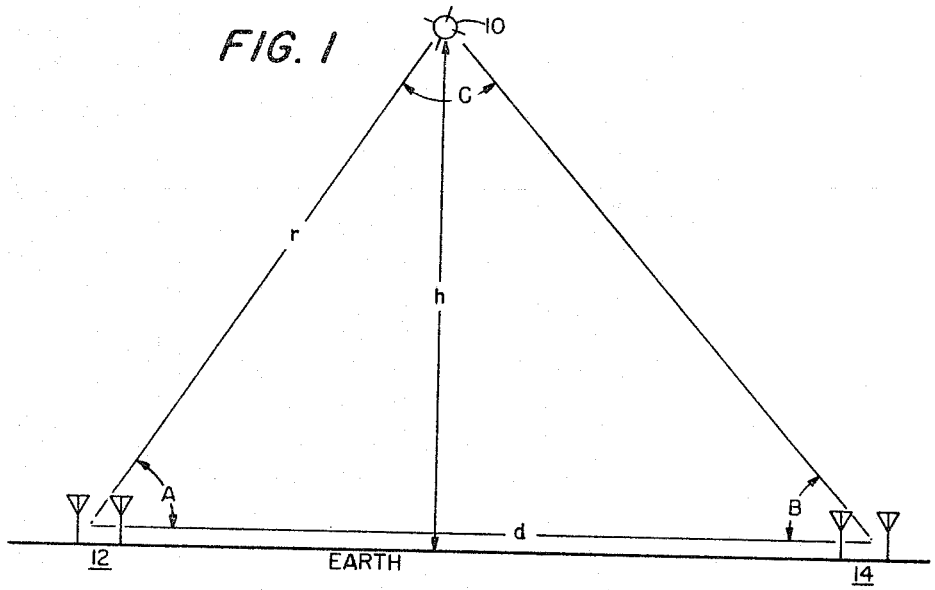
FIG. 1 is a schematic view of a portion of a space surveillance system.

Referring now to the drawings, wherein like reference characters designate like or corresponding parts throughout the several views, there is shown in FIG. 1 a satellite 10 which is orbiting at a height $h$ and at angular directions A and B respectively from two radio interferometer receiver sites 12 and 14 which are separated by a distance $d$ and are part of a radio interferometer type space surveillance system such as the Navy Space Surveillance System.

Figure 2:
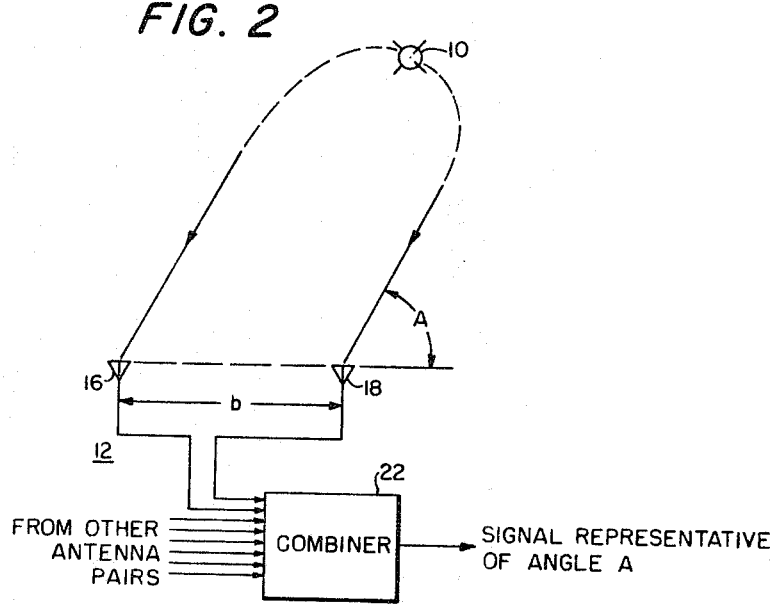

Site 12 is shown in more detail in FIG. 2 wherein the illustrated antennas 16 and 18 are representative of many other antenna pairs at the site which are separated by differing baseline distances $b$. As is explained more fully in the previously mentioned Kaufman and Hayden patent, the reflected energy from satellite 10 produces signals in antennas 16 and 18 that are different in phase in a manner related to the angular position of satellite 10, i.e. angle A, and the baseline distance $b$. The plurality of antennas are connected to a combiner 22 which produces an unambiguous signal representative of angle A. The apparatus at site 14 is, of course, similar and produces a signal unambiguously representative of angle B.

Before describing the subject matter of the present invention which is illustrated in FIG. 3, it will be helpful to discuss the trigonometric relationships between the satellite 10 and the sites 12 and 14 as shown in FIG. 1.

Identifying the distance from satellite 10 to site 12 as $r$ and the angle subtended at the satellite 10 as C, then (1) $$h = r \sin A$$

(2) $$\sin C = \sin(180° - A - B) = \sin(A+B) = \sin A \cdot \cos B + \sin B \cdot \cos A$$

and from the Law of Sines (3) $$\frac{r}{\sin B} = \frac{d}{\sin C} \text{ or } r = \frac{d \sin B}{\sin A \cdot \cos B + \sin B \cdot \cos A}$$

Combining (1) and (3)

(4) $$h = d \frac{\sin A \sin B}{\sin A \cdot \cos B + \sin B \cdot \cos A}$$

An inspection of the Equation 4 reveals that the height of the satellite 10 can be expressed, or computed, in terms of the distance between the sites 12 and 14 (a known constant) and trigonometric functions of the angular position of the satellite 10 as measured at sites 12 and 14. The computing circuit illustrated in FIG. 3 functions to accomplish this computation of satellite height.

Referring now to FIG. 3, the signal produced at site 12 by combiner 22, which is representative of angle A, is applied to a conventional sin-cos resolver 26 which in turn produces signals representative of $\sin A$ and $\cos A$. Similarly the signal produced by combiner 24 at site 14, which is representative of angle B, is applied to a conventional sin-cos resolver 28 which in turn produces signals representative of $\sin B$ and $\cos B$. As illustrated in FIG. 3, the output signals of resolvers 26 and 28 are utilized as the input signals to conventional logarithmic amplifiers 32, 34, 36 and 38, the outputs of which are representative of the logarithms of the respective input signals.

The output signals of logarithmic amplifiers 34 and 36, which are respectively representative of the logarithms of $\sin A$ and $\sin B$, are combined by adder 42 to produce a signal representative of the sum of the logarithms of $\sin A$ and $\sin B$.

Amplifier 36 is also connected, together with the output of amplifier 32 which is representative of the logarithm of $\cos A$, to adder 48 to produce a signal representative of the sum of the logarithms of $\sin B$ and $\cos A$. This latter signal is applied to a conventional anti-logarithmic amplifier 52 and therein converted, according to well known logarithmic theory, into a signal representative of the product of $\sin B$ and $\cos A$.

Similarly, amplifier 34 is also connected, together with the output of amplifier 38 which is representative of the logarithm of cos $B$, to adder 44 to produce a signal representative of the sum of the logarithms of sin $A$ and cos $B$. This latter signal is applied to anti-logarithmic amplifier 46 and therein converted into a signal representative of the product of sin $A$ and cos $B$.

The output signals from anti-logarithmic amplifiers 46 and 52 are combined by adder 54 to produce a signal representative of the sum of the products sin $A \cdot \cos B$ and sin $B \cdot \cos A$. This latter signal is converted by logarithmic amplifier 56 into a signal which is representative of the logarithm of the quantity $$\sin A \cdot \cos B + \sin B \cdot \cos A$$

The outputs of adder 42 and logarithmic amplifier 56 are connected to difference circuit 58, the output of which is a signal representative of the sum of the logarithms of sin $A$ and sin $B$ minus the logarithm of the quantity sin $A \cdot \cos B +$ sin $B \cdot \cos A$. The output signal of difference circuit 58 is connected to anti-logarithmic amplifier 62 wherein this signal is converted into a signal that is representative of the quantity $$\frac{\sin A \sin B}{\sin A \cos B + \sin B \cos A}$$

which quantity when accompanied by the proper calibration to include the constant $d$, is recognizable from Equation 4 as the expression for the height $h$ of satellite 10. If desired, the height may be recorded on recorder 64.

There has been disclosed a circuit of conventional components which, when connected to receive signals indicative of satellite direction relative to two receiver sites, provides an indication of the height of the satellite. However, it will be apparent that the computing circuit of FIG. 3 is useful generally in situations which have geometrical configurations similar to that illustrated in FIG. 1, i.e. in a triangle where two angles and the included side are known and the perpendicular distance from the included side to the unknown angle is desired. Obviously many other modifications and variations of the present invention are possible in the light of the above teachings. It is therefore to be understood that within the scope of the appended claim the invention may be practiced otherwise than as specifically described.

What is claimed and desired to be secured by Letters Patent of the United States is:

In a satellite surveillance system that includes transmitting means that propagates a thin wall of electromagnetic energy:

First receiving site means for detecting electromagnetic energy reflected by a satellite penetrating said wall of energy and for producing a first electrical signal representative of the direction of said satellite from said first receiving site means;

Second receiving site means, separately located from said first receiving site means, for detecting electromagnetic energy reflected by a satellite penetrating said wall of energy and for producing a second electrical signal representative of the direction of said satellite from said second receiving site means and A computer connected to receive said first and second electrical signals and to produce an indication of the height of said satellite according to the equation $$h = d\left(\frac{\sin A \cdot \sin B}{\sin A \cdot \cos B + \sin B \cdot \cos A}\right)$$

where
$h$ is the height of the satellite,
$d$ is the distance between said first and second receiving site means and
$A$ and $B$ are the angular directions from said first and second receiving site means to the satellite,
said computer comprising:
First and second sin-cos resolvers connected to receive said first and second electrical signals;
Logarithmic amplifiers connected to said first and second sin-cos resolvers to produce signals representative of the logarithms of sin $A$, sin $B$, cos $A$ and cos $B$;
A first combining circuit connected to said logarithmic amplifiers for producing a third electrical signal representative of the sum of the logarithms of sin $A$ and sin $B$;
A second combining circuit connected to said logarithmic amplifiers for producing a fourth electrical signal representative of the logarithm of the sum of sin $A \cdot \cos B$ and sin $B \cdot \cos A$;
A difference circuit connected to receive said third and fourth electrical signals;
An anti-logarithmic amplifier connected to said difference circuit and
A recorder connected to said anti-logarithmic amplifier.

References Cited by the Examiner

UNITED STATES PATENTS 1,433,070 10/1922 Conners.
2,569,328 9/1951 Omberg.

OTHER REFERENCES

Easton, R. L., et al., The Navy Space Surveillance System, in Proceedings of The Institute of Radio Engineers, volume 48, April 1960, pp. 663–665 relied upon.

Robb et al., Some Electronic Analogue Computer Techniques, University of Connecticut Engineering Experiment Station Bulletin, Number 9, January 1953, QA 76–4R6, pp. 8–16 relied on.

RODNEY D. BENNETT, *Primary Examiner.*

CHESTER L. JUSTUS, *Examiner.*

D. C. KAUFMAN, *Assistant Examiner.*